UNITED STATES PATENT OFFICE.

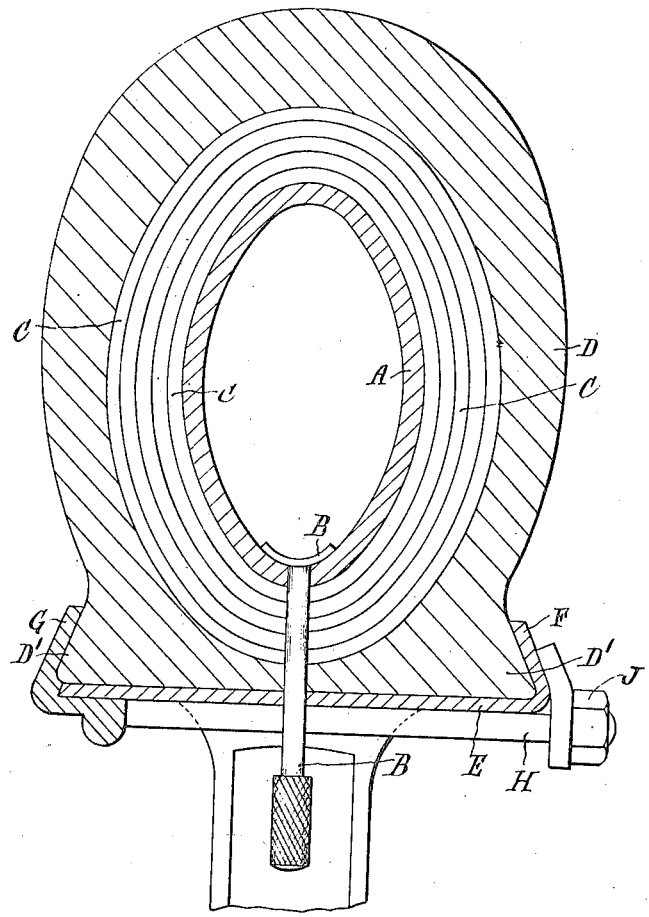

HENRY BROWN, OF PUTNEY HILL, LONDON, ENGLAND.

PNEUMATIC TIRE.

1,213,735.

Specification of Letters Patent.   Patented Jan. 23, 1917.

Application filed July 5, 1916.  Serial No. 107,641.

*To all whom it may concern:*

Be it known that I, HENRY BROWN, a subject of the King of Great Britain, residing at Putney Hill, in the county of London, England, have invented new and useful Improvements Relating to Pneumatic Tires, of which the following is a specification.

This invention relates to pneumatic-tire air-tubes of the kind wherein a ligament of india rubber is wound under tension around a stout rubber tube.

According to my invention, in order to produce a tire of great resiliency, a plurality of layers of india rubber cord are wound under suitable tension around a thick-walled india rubber tube. The cord may be advantageously secured at suitable intervals around the air-tube, for example by winding on two cords simultaneously in opposite directions and knotting or twisting them together at the desired intervals.

When the desired number of layers of india rubber cord have been applied, the air-tube is preferably covered with a layer of india rubber secured thereto in any suitable known manner, for example by india rubber solution. Or if desired, the covering layer may be formed of a suitable vulcanizable india rubber composition, which is vulcanized after it has been placed in position, so as to unite the outermost convolutions of the cord to said covering layer and to each other. In some cases moreover the covering layer may be dispensed with.

In the accompanying drawing, I have shown how my said invention may be conveniently and advantageously carried into practice, the air-tube and its inclosing cover being shown in transverse section.

A is a thick-walled india rubber tube, to which a valve casing B is secured in a known manner. On the tube A there is wound under tension a number of layers of india rubber cord C, for example by hand or by means of a machine, the air-tube being preferably kept partially inflated during such winding. The air-tube is here made of elliptical or oval form in cross-section, the major axis of the ellipse or oval being arranged vertically, *i. e.* radially of the air-tube. The ellipse or oval is preferably made with the major and minor axes of such relative dimensions that when the tube is inflated with air under pressure, the cross-section of the tube will assume a substantially circular form at the place where the tire is resting on the ground and carrying a normal load.

In winding on the india rubber cord, it may be secured at intervals by winding around the tube and the layer or layers of cord thereon a few turns of a thinner india rubber cord and then tying the ends of such thinner cord together and cutting off the parts beyond the knot. Or the cord may be formed into a loop and be wound around the tube in opposite directions. The tying then takes place between the two parts or limbs of the same cord at suitable intervals along the tube, the winding being continued after the tying, that is to say the cord is not cut after the tying.

The air-tube is inclosed in an outer cover D, which may be of any suitable known construction, the "feet" D′, D′ of which are retained on the wheel-rim E, *e. g.* by flanges F, G, one of which G may be removably secured in position, *e. g.* by bolts H and nuts J.

I claim:—

1. An air-tube for a pneumatic tire, said air-tube comprising a thick-walled soft india rubber tube and a plurality of layers of india rubber cord wound under tension around said tube.

2. An air-tube for a pneumatic tire, said air-tube comprising a thick-walled soft india rubber tube, a plurality of layers of india rubber cord wound under tension around said tube, and an outer covering of india rubber secured to the outer surface of the wound cord.

3. An air-tube for a pneumatic tire, said air-tube comprising a thick-walled soft india rubber tube, and a plurality of layers of india rubber cord wound in tension around the tube in opposite directions.

4. An air-tube for a pneumatic tire, said air-tube comprising a thick-walled soft india rubber tube, and a plurality of layers of india rubber cord wound in tension around the tube in opposite directions, such cord being secured at intervals.

5. An air-tube for a pneumatic tire, said air-tube comprising a thick-walled soft india rubber tube, a plurality of layers of india rubber cord wound in tension around the tube, and a thinner india rubber cord wound around the tube and tied so as to secure the india rubber cord forming the layers above mentioned.

HENRY BROWN.

Witnesses:
 HERBERT A. BEESTON,
 CONRAD K. FALKENSTEIN.